United States Patent
Hale

[11] 3,905,408
[45] Sept. 16, 1975

[54] VACUUM FLITCH TABLE FOR VENEER SLICER

[75] Inventor: Thomas F. Hale, New Albany, Ind.

[73] Assignee: Capital Machine Company, Inc., Indianapolis, Ind.

[22] Filed: Mar. 29, 1974

[21] Appl. No.: 456,054

[52] U.S. Cl. .................. 144/178; 83/451; 248/363; 251/61.4
[51] Int. Cl.² ...................... B27L 5/06; B25B 11/00
[58] Field of Search ........ 251/61.4; 269/21; 83/152, 83/402, 451, 453, 721; 144/178; 279/3, 1 J; 51/235; 248/362, 363

[56] References Cited
UNITED STATES PATENTS

| | | | |
|---|---|---|---|
| 2,556,623 | 6/1951 | Lipkau | 251/61.4 X |
| 2,782,574 | 2/1957 | Copold | 269/21 |
| 2,910,265 | 10/1959 | Anander | 248/363 |
| 2,998,256 | 8/1961 | Lipkins | 51/235 |
| 3,307,817 | 3/1967 | Cocito | 248/362 |
| 3,335,994 | 9/1967 | Cocito | 248/363 |
| 3,680,612 | 8/1972 | Hale | 144/178 |
| 3,711,082 | 1/1973 | Seidenfaden | 269/21 |
| 3,724,835 | 4/1973 | Gnoth | 269/21 |

FOREIGN PATENTS OR APPLICATIONS

| | | | |
|---|---|---|---|
| 1,131,608 | 6/1962 | Germany | 269/21 |
| 146,868 | 1954 | Sweden | 269/21 |

Primary Examiner—Donald R. Schran
Assistant Examiner—W. D. Bray
Attorney, Agent, or Firm—William R. Coffey

[57] ABSTRACT

In a veneer slicer comprising a flitch table providing a mounting surface, a plurality of dogs for gripping a flitch at a first distance from the mounting surface and holding the flitch securely against a central portion of the mounting surface, a plurality of extension dog assemblies mounted on the flitch table to grip a flitch at a second and greater distance from the mounting surface, a power drive for reciprocating the flitch table in the plane of the mounting surface, and a knife assembly movable along a path toward and away from the mounting surface, the improvement comprising a vacuum device for holding flitches to the table. The vacuum device includes a vacuum source such as a vacuum pump, at least one vacuum cell plate mounted on the flitch table for movement therewith and secured to the flitch table by the gripping action of the first-mentioned dogs. The cell plate is disposed between a pair of the said extension dog assemblies such that the jaws of the extension dog assemblies can engage a flitch and hold it against the cell plate. The cell plate provides a front surface facing the knife assembly and against which the flitch is held and a plurality of cell areas in the front surface, the cell areas being connected to the vacuum source. Each cell area is equipped with a valve effective to open the cell area to the vacuum source only when the cell area is completely covered by a flitch.

30 Claims, 14 Drawing Figures

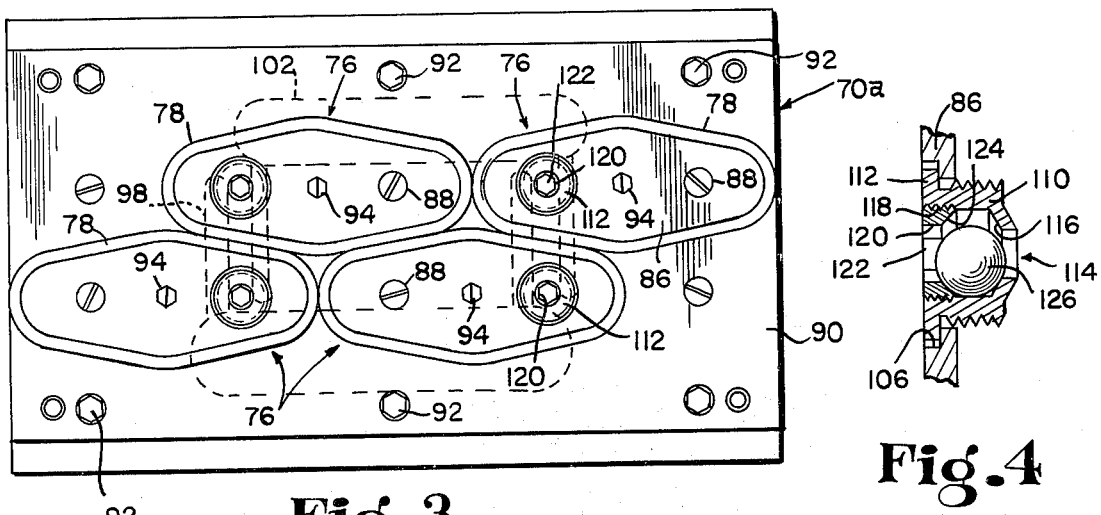
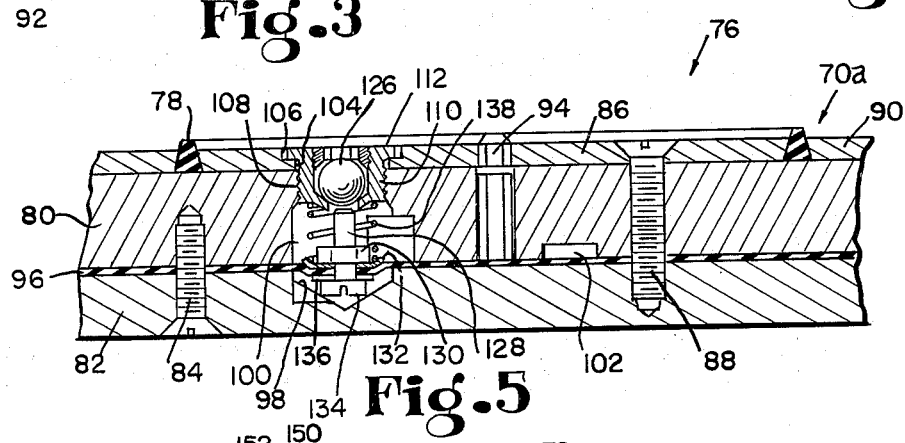
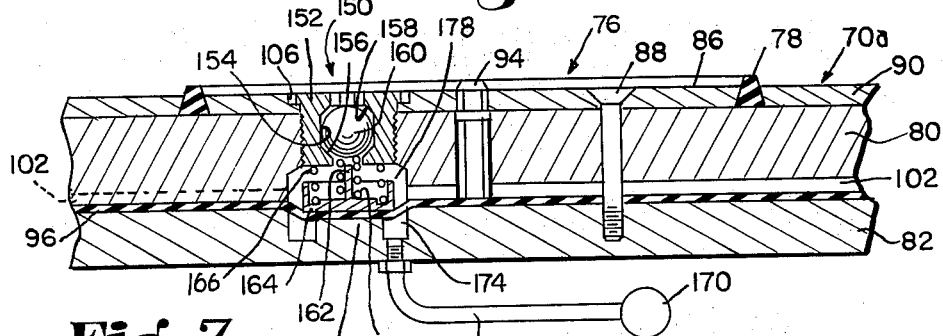
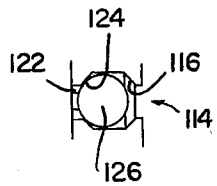
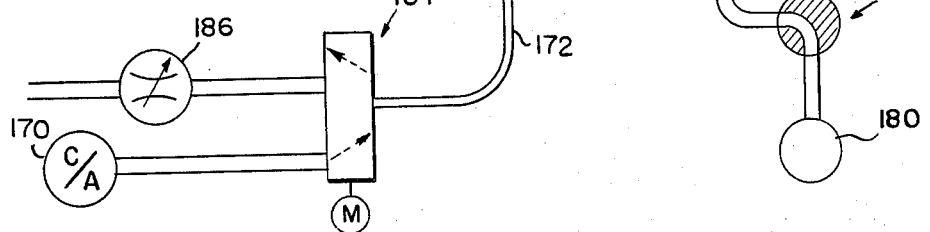

VACUUM FLITCH TABLE FOR VENEER SLICER

The present invention relates to veneer slicers, and more particularly to the provision of vacuum means for holding flitches to the flitch tables of such slicers.

Conventional veneer slicers are shown in the very early Koss U.S. Pat. No. 793,306 issued June 27, 1905 and a later Koss U.S. Pat. No. 3,441,069 issued Apr. 29, 1969. These Koss patents show the basic structural components of a veneer slicer including knife, pressure bar, skirt, cap, and flitch table.

In my own U.S. Pat. No. 3,680,612 issued August 1, 1972, I disclose the structure of hydraulically actuated dogs and hydraulically actuated extension dog assemblies for holding flitches to the flitch tables for reciprocation relative to the knife and pressure bar assembly. My preferred embodiment of the present invention includes one or more vacuum cell plates secured to the flitch table by means of the regular dogs to be between the extension dog assemblies. In my preferred system, the extension dog assemblies can be used to hold a large flitch against the vacuum cell plate during the initial slicing operation on the flitch. After a considerable portion of the flitch is sliced into veneer, the extension dog assemblies are retracted to leave the flitch held against the vacuum cell plate which includes cells evacuated by a vacuum pump.

While the preferred embodiment of my present invention is designed for use with such extension dog assemblies which will hold the larger flitches while they are initially being sliced, it will be appreciated as this description progresses that my vacuum holding means can be used by itself and without any retractable dogs to hold relatively large flitches. I have successfully held flitches with my vacuum cell plates and without the extension dog assemblies throughout the entire slicing operation. It will further be appreciated that, while it is convenient to hold my cell plates onto the flitch table using the regular dogs, any sort of convenient means for mounting the cell plates may be used within the scope of my present invention.

My vacuum means is being offered as one solution to the basic industry problem of obtaining more slices of veneer from a flitch. When a flitch is secured to a flitch table by hydraulically actuated dogs or mechanically actuated dogs, the flitch can be sliced down to a point where the knife and pressure bar assembly can still clear the dogs. Since such dogs project as much as ¾ inch or an inch from the mounting surface of the flitch table, a substantial thickness of the heart of the flitch cannot be sliced, in some cases amounting to more than one inch.

Some inventors have suggested gluing the flitch to a backing board, using the dogs to grip the backing board, and then slicing down to the glue line. Such techniques are disclosed in U.S. Pat. Nos. 3,397,723 issued Aug. 20, 1968 to David E. Hervey and 3,295,571 issued Jan. 3, 1967 to Per Bork.

There are several problems involved in gluing flitches to backing boards, not the least of which is the messiness of the process involved. The cost of the glue, the cost of the backing boards, and the cost of the labor involved in gluing the flitches to the backing boards is quite substantial. Further, since the flitches must be soaked in extremely hot water for lengthy periods of time such as one or two days, the gluing of a hot, damp flitch to a backing board itself involves extreme process controls.

I am aware of one other company which is presently offering to sell vacuum systems for holding flitches on flitch tables. While my knowledge about such systems is limited, I believe my present invention constitutes a very substantial advantage over the systems being offered. For instance, I understand that the system being offered comprises a plurality of ports in a rubber or rubberoid mat, which ports are connected to a vacuum source. A flitch is placed against the mat to cover only a portion of the ports because of the irregular shapes and sizes of the flitches. The covered ports are evacuated by the pumping action. Those ports which are not covered or completely covered by the flitch are left open to the vacuum source. Such a system, therefore, involves a tremendous amount of air flow and pumping capacity, thereby requiring expensive vacuum pumping equipment.

My system comprises a vacuum source such as a vacuum pump and at least one vacuum cell plate mounted on the flitch table for movement therewith. The cell plate provides a front surface facing the knife and pressure bar assembly and against which a flitch is held, and a plurality of cell areas in the front surface. Sealing means extends about each cell area. Conduit means are provided for connecting each cell area to the vacuum source, the conduit means including, for each cell area, valve means. Each said valve means includes actuating means for determining when its associated cell area is completely covered by a flitch and opening the cell area to the vacuum source only when it is completely covered by a flitch.

Specifically, the vacuum means of my present invention includes a plurality of cell areas with valve means associated with each cell area and arranged to open each cell area to the vacuum source only when the cell area is completely covered such that it can be evacuated.

In a preferred embodiment of my invention, each valve means includes means providing a valve passageway having a first seat therein, and a valve member movable against the first seat to close the passageway, thereby closing its associated cell area to the vacuum source. The actuating means includes means for holding the valve member away from the first seat and releasing the valve member for movement against the first seat when the cell area is not completely covered such that a vacuum can form therein. In a preferred embodiment, each actuating means includes an air actuated plunger for moving the valve member, a source of compressed air, and conduit means for connecting the plunger to the source of compressed air. This conduit means preferably includes valve means for simultaneously supplying air under pressure to the plungers and simultaneously exhausting the air from the plungers as well as selectively variable orifice means through which air under pressure is exhausted, whereby the speed of movement of the plungers in releasing the valve members is controlled. In this embodiment, the valve passageway also provides a second seat spaced apart from the first valve seat, the valve member being movable between the seats and movable against the second seat to close the passageway. The actuating means is effective to move the valve member against the said second seat and to hold it there while a flitch is being placed against the front surface of the cell plate and to release the valve member for movement toward the first valve seat when the flitch is against the front surface.

In a preferred embodiment of the present invention, each cell plate provides a back surface having a plurality of cavities therein in registry respectively with the cell areas and a rubber diaphragm covering the back surface and the cavities. The aforesaid conduit means for the compressed air includes a base plate having air passageways formed therein, portions of which overlie the cavities such that positive air pressure in the passageways deflect the portions of the diaphragm overlying the cavities. The plungers are yieldably urged against the diaphragm deflecting portions to be moved by the portions when positive air pressure is applied to the air passageways.

Another object of my invention is to provide a vacuum system for holding flitches to a flitch table, the system comprising a vacuum pump, means providing a plurality of cell areas against which flitches are held, sealing means bounding each cell area sealably to engage the flitches, valve means for connecting each cell area to the vacuum pump, each valve means including means providing a valve passageway communicating between its associated cell area and the vacuum pump, a valve member for closing the passageway, and means for actuating the valve member to keep the passageway open when its associated cell area is completely covered by a flitch and a vacuum is formed in the covered cell area and closed when the cell area is not completely covered by a flitch such that a vacuum can form. In a preferred embodiment of this invention, the valve member and the passageways are proportioned and designed such that, when the cell area is completely covered and evacuated, the pressure on opposite sides of the valve member is equalized such that the valve member, when released, will not move to its closing position. If the cell area is not completely covered, the movement of air from the cell area through the valve passageway will move the valve member into sealing engagement with a valve seat, i.e., to its valve closing position.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

IN THE DRAWINGS

FIG. 3 is a view of a small vacuum cell plate for illustration purposes;

FIG. 4 is a fragmentary sectional view of the valve associated with one cell area;

FIG. 5 is a fragmentary sectional view of the plate of FIG. 3 showing one cell area and its valve;

FIG. 6 is an enlarged diagrammatic view showing how the valve ball closes the valve passageway;

FIG. 7 is a fragmentary sectional view showing the structure of FIG. 5 as adapted for use on horizontal slicers;

FIG. 8 is a diagrammatical view of the system of either FIGS. 5 or 7;

Figure 1:
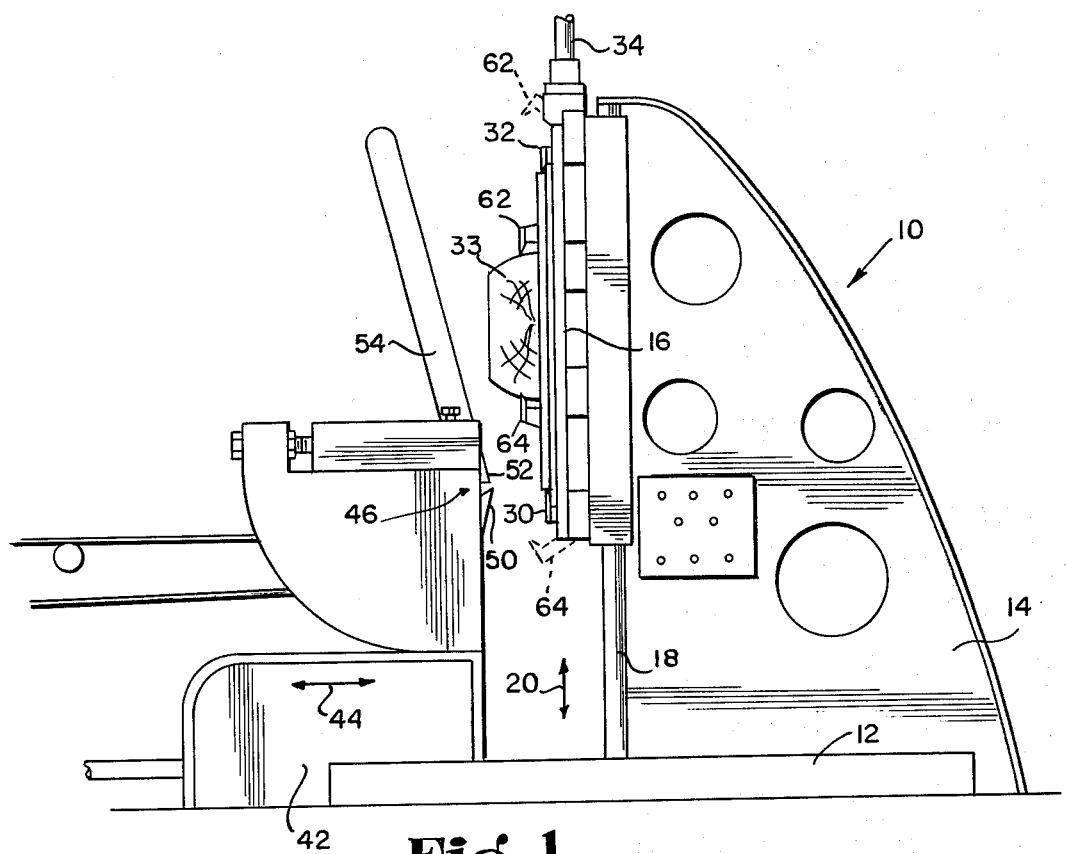
FIG. 1 is an end elevational view of a conventional veneer slicer with the vacuum system of the present invention mounted thereon.

Referring now to the drawings, and particularly to FIG. 1, it will be seen that I have illustrated a veneer slicer 10 of conventional form comprising a base 12, flitch table supports 14 (only one of which is shown in the drawings), and a flitch table 16. This type of flitch table 16 and the means by which it is supported for reciprocation is well known and was disclosed as early as June 27, 1905 in the U.S. Pat. No. 793,306 issued to Louis Koss. Particularly, the plurality of transversely spaced apart supports 14 provide guides such as indicated at 18 upon which the flitch table 16 reciprocates as indicated by arrow 20 in FIG. 1. For reasons which are well known in the veneer slicing art, the table 16 reciprocates in a generally vertical plane, but the reciprocation is along a line inclined with respect to vertical.

It is important to understand that very large flitches are placed upon the flitch table and reciprocated with the table at a very high speed. The flitch reciprocates in the said vertical plane and in the direction of inclination of the guides 18. Thus, the means holding the flitches must accommodate not only the vertically oriented force vectors, but the horizontal force vectors produced by the inclination of the guides 18.

Conventionally, a plurality of transversely spaced apart dogs 30, 32 is provided for gripping a flitch 33 at a relatively short distance from the mounting surface of the flitch table 16 and holding the flitch rigidly against a central portion of the mounting surface. In the accompanying drawings, the dogs 30, 32 which usually grip the flitch 33, are shown instead gripping the vacuum cell plate of the present invention. The veneer slicer 10, therefore, can be used without the vacuum holding means of the present invention, i.e., using the dogs 30, 32 in conventional fashion. In the illustrated conventional system, the lower dogs 30 and the upper dogs 32 are guided for vertical reciprocation on the flitch table 16 and driven by hydraulic cylinders 34, 36 respectively. Conventionally, a flitch 33 is held against the central portion of the mounting surface of the flitch table to extend longitudinally therealong and the lower dogs 30 are driven upwardly and the upper dogs 32 are driven downwardly to engage the flitch at a point approximately ⅝ inch from the mounting surface to hold the flitch rigidly against the mounting surface.

The slicer 10 includes a carriage 42 mounted on a base 12 for guided shiftable movement toward and away from the plane of reciprocation of the flitch table 16 as indicated by the arrow 44. The means by which the carriage 42 is shifted in the direction of the arrow 44 is well known and conventional. A knife and pressure bar assembly 46 is mounted on the carriage 42 so that the assembly is movable along a path toward and away from the mounting surface of the flitch table 16. In the illustrated slicer 10, a member commonly called a skirt is provided for supporting the knife 50 at a point just below the pressure bar 52, the pressure bar 52 being carried by an assembly 54 commonly called a cap and which is adjustably movable on the skirt. This arrangement of a knife 50, pressure bar 52, skirt, and cap 54 are well known and disclosed, for instance, in the early Koss U.S. Pat. No. 793,306 and a later Koss U.S. Pat. No. 3,441,069 issued Apr. 29, 1969. My U.S. Pat. No. 3,680,612 identifies the skirt by the reference numeral 48 and describes its well known functional relationship to the knife, pressure bar and cap.

As the flitch 33 moves downwardly, the knife and pressure bar assembly 46 slices a thin sheet of veneer from the flitch. The assembly 46 is advanced step-by-step toward the flitch table 16, the distance of each step being approximately equal to the thickness of the slice of veneer being cut and each step being completed before the table 16 begins to move downwardly. Of course, during the slicing operation, the assembly 46 moves toward the flitch table 16 to the point where the assembly is just to the left (FIG. 1) of the plane defined by the movement of the dogs 30, 32. Further movement of the assembly 46 to the right (FIG. 1) will bring the knife 50 and pressure bar 52 into contact with the reciprocating dogs 30, 32, thereby damaging the knife and pressure bar and dogs. Thus, the portion of the flitch to the right of the plane defined by the dogs 30, 32, i.e., the portion of the flitch engaged by the dogs 30, 32, conventionally cannot be sliced into veneer.

In my U.S. Pat. No. 3,680,612, I disclosed my concept of extension dog assemblies mounted on the flitch table and proportioned and designed to grip a flitch at a second and greater distance from the mounting surface. In the illustrative embodiment, such extension dog assemblies are indicated by the reference numeral 60 and include upper jaws 62 and lower jaws 64 which are driven by hydraulic cylinders 66 as taught in my said U.S. Pat. No. 3,680,612. Such extension dog assemblies 60 are used to hold relatively large flitches against the flitch table, which large flitches might not be securely held by the regular dogs 30, 32. As taught in my U.S. Pat. No. 3,680,612, after the flitches are initially sliced down to a point approaching the plane of movement of the jaws 62, 64, the jaws are retracted to their broken-line position shown in FIG. 1 which will remain above and below the knife and pressure bar assembly during the slicing operation.

In the preferred embodiment of my present invention, I propose to use the extension dog assemblies to assist the vacuum holding means in the same manner that I use the extension dog assemblies to assist the regular dogs 30, 32. Further, for convenience, I prefer to hold the vacuum cell plates onto the flitch table by means of the regular dogs 30, 32. Thus, a veneer slicer 10, in accordance with my present invention, can quickly and easily be converted to a vacuum holding system and then reconverted to a system using only dogs. I plan to offer this feature because some flitches which are extremely porous or which cannot be provided with smooth, flat back surfaces may not be ideally suited for holding by a vacuum system. It will be appreciated, however, that by using my extension dog assemblies 60 initially to hold a flitch during the slicing operation, the vacuum system will not have to hold excessively large flitches without assistance.

I want to point out, however, that my vacuum system has been used successfully to hold relatively large flitches during slicing operations and without the assistance of any dogs, even my extension dog assemblies 60.

Figure 2:
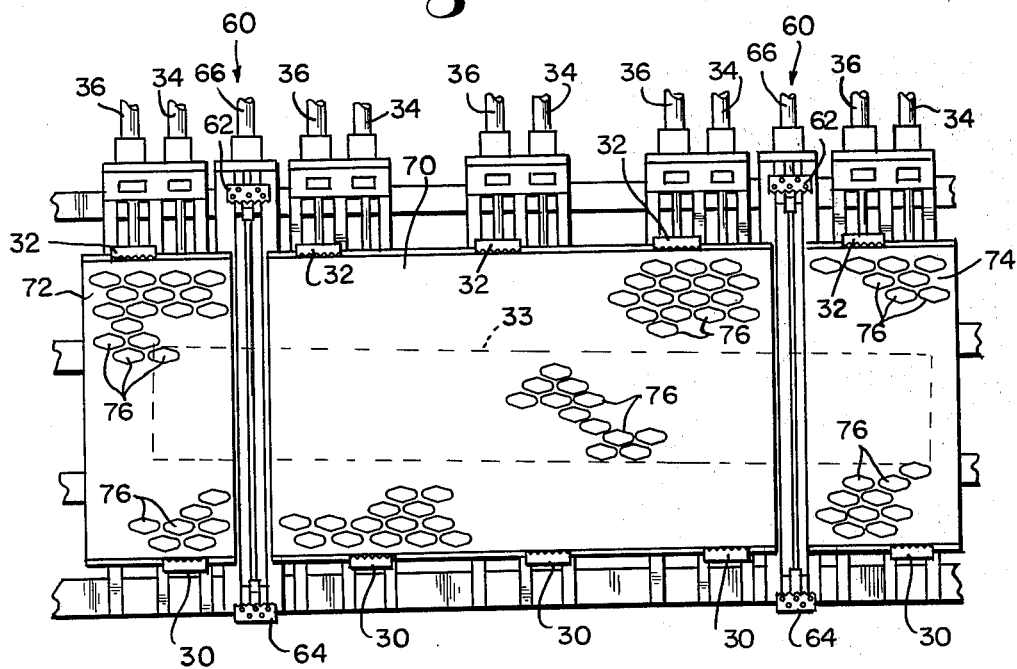
FIG. 2 is an enlarged fragmentary view of the flitch table showing the vacuum system mounted thereon.

Looking at FIG. 2, it will be seen that I have shown a central vacuum cell plate 70 and smaller end cell plates 72, 74. The extension dog assemblies are disposed between the cell plates. While I show only two such assemblies 60, it will be appreciated that I may have, for instance, extension dog assemblies at the outer ends of the plates 72, 74. It will further be appreciated that the number of cell plates and the size of the cell plates shown are merely illustrative in that I may use any number of different combinations of cell plates. In fact, I may dispense with the extension dog assemblies 60 altogether and use one large vacuum cell plate, the length of which would be equal to or greater than the length of most flitches to be cut.

The cell plates 70, 72, 74 are secured to the flitch table 16 by the dogs 30, 32. Other means may be used to secure such cell plates to the flitch table 16. The cell plates 70, 72, 74 each have a plurality of cell areas 76 provided on the front surfaces of the cell plate, i.e., the surfaces facing the knife and pressure bar assembly 46. As this description progresses, I will disclose several techniques by which such cell areas may be provided. For instance, turning to FIGS. 3–7, in which I show a small illustrative plate 70a, the cell areas 76 are defined by gaskets 78 which extend about the areas or which bound the areas sealably to engage the flitches held thereagainst.

The illustrative plate 70a includes a center plate 80, base plate 82 and screws 84 for holding the base plate to the center plate. A cover plate 86 for each cell area is secured to the center plate by a screw such as indicated at 88. The areas outside the cell area may be covered by a front plate 90 which is secured to the center plate, for instance, by the screws 92. The edges of the cell cover plates 86 are formed as shown in the sectional views of FIGS. 5 and 7 to accommodate a gasket 78 which is trapezoidal in cross section. While I show such gaskets having such cross sections, I have successfully used gaskets which are rectangular in cross section. I have also successfully used such gaskets which are adhesively attached to the front surface of the center plate 80.

It will be appreciated that the view of FIG. 5 is oriented 90° out of position in that the plates 80, 82, 90 will extend vertically when they are attached to the flitch table 16. In FIG. 7, however, the illustrative structure is designed for use on a horizontal slicer, i.e., on a veneer slicer the flitch table of which lies in a horizontal plane and moves in a horizontal plane. The differences between the FIG. 7 structure and the FIG. 5 structure will become apparent as this description progresses.

Each illustrative cell area 76 is provided with a dogging pin 94, the outer portion of which is sharpened to dig into the flitch held thereagainst. The multitude of dogging pins serve to keep the flitch from shifting on the cell plates. The force of the vacuum system pulls the flitches into engagement with the dogging pins. The illustrative dogging pin 94 is a rigid sharpened pin, the shank portion of which extends through openings in the cell cover plate 86 and the center plate 80.

A rubber sheet or diaphragm 96 is disposed between the plate 80 and the base plate 82 to overlie passageways and/or cavities for compressed air formed in the base plate 82. A cavity 100 is formed in the back surface of the plate 80 to be in registry with a valve passageway to be described hereinafter. Each cavity 100 is in registry with a cavity or portion of a passageway 98 in the base plate 82. Passageways 102 are formed in the center plate 80 to connect the cavities 100 to the vacuum pumping source.

As this description progresses, it will be appreciated that many conduits and passageways are necessary to connect the vacuum pump and the air compressor to the cell areas. Such conduits and passageways come under the broad heading of conduit means. In other words, the positive air pressure cavities in the plate 82 may be connected to the air compressor by passageways formed in the plate as well as tubing and hoses while the vacuum cavities 100 formed in the plate 80 may be connected to the vacuum pump by passageways such as indicated at 102, tubes and hoses. I find it convenient to mill slots and cavities in the plates 80, 82 to form the connecting passageways.

It will be appreciated that the vacuum pump and the air compressor may be mounted on the floor and connected to my vacuum system (cell plates) by hoses which flex during the movement of the flitch table.

Each cell cover plate 86 is formed with a valve opening 104 bounded by a rabbet 106 and which is in registry with a threaded opening 108 providing communication with the cavity 100. Each cell area 76 includes valve means as mentioned heretofore. The valve means of FIGS. 4, 5 and 6 comprises a valve body 110 having a flange 112 received in the rabbet 106 and a valve passageway 114 extending coaxially therethrough. The valve passageway 114 is formed to provide a first conical valve seat 116 in the passageway, and the outer end of the passageway 114 is threaded as indicated at 118. An orifice member 120 is threaded into the outer end of the passageway 114, and it provides an opening 122 therethrough which is in registry with the passageway. The opening 122 may be a hexagonal opening to fit an Allen wrench used to secure the orifice member into position. The orifice member is formed to provide a second conical valve seat 124 spaced apart from the valve seat 116. A valve ball 126, which may be a rubber ball, is disposed in the passageway 114 for movement between the seats 116, 124. The ball 126 will sealably engage either seat 116, 124 to close the passageway 114. The diameter of the passageway 114 and the distance between the seats is greater than the diameter of the ball 126 such that, when the ball 126 is not engaged with either seat, air movement through the passageway 114 is possible. FIG. 4 shows the ball 126 when it is in its nonclosing position, FIG. 5 shows the ball against the seat 116 and FIG. 6 shows the ball against the seat 124.

The illustrative valve means includes actuating means for determining when its associated cell area 76 is completely covered by a flitch and opening the cell area to the vacuum pump only when it is completely covered by a flitch. The illustrative actuating means includes a plunger 128 which may be, for instance, the shank of a screw. A nut 130 and a cupped washer 132 are placed upon the shank of the screw on one side of the diaphragm while the head 134 of the screw and a flat washer 136 are on the other side of the diaphragm. The nut 130 is tightened such that the screw moves when the diaphragm portion overlying the cavity 100 and the cavity 98 is deflected. A spring 138 is provided for urging the shank 128 away from the ball 126, i.e., to its ball releasing position. When compressed air is admitted to the cavity 98, the portion of the diaphragm 96 is registry therewith is deflected toward the ball 126 such that the shank 128 will engage the ball and move it against the seat 124 to close the passageway 114. The cavity 100 is evacuated because it is connected to the vacuum pump. The ball 126 is held against the seat 124 until the flitch is placed against the cell plate. When the flitch is securely against the cell plate, the positive air pressure is released from the cavity 98 to permit the spring 138 to move the plunger away from the ball 126. If the cell area is completely covered such that a vacuum can form within the cell area, i.e., in the space bound by the gasket 78, there will not be sufficient air flow from the cell area through the valve passageway to move the ball 126 against the seat 116. In such a case, the ball will simply drop downwardly to its position shown in FIG. 4 such that the cell area is open to the vacuum pump.

If the cell area is not completely covered, when the plunger 128 is moved away from the ball 126 so that the ball can move away from the seat 124, the movement of air through the opening 122 will be sufficient to move the ball 126 against the seat 116 to close the passageway 114, i.e., to close the cell area to the vacuum pump.

In either case, only a small amount of air will flow through the valve passageway 114. If the cell area is completely covered, only the air which is required to evacuate the cell area will move through the passageway. If the passageway is not completely covered, the ball 126 will move against the seat 116 to close the passageway rather quickly to stop the air flow. My system, therefore, can operate with a relatively small capacity vacuum pump. Only those cell areas which are completely covered will be open to the vacuum pump. Those cell areas not completely covered will be closed by their respective valves so as not to introduce any significant air flow into the vacuum system.

It will be appreciated that by using the diaphragm 96 between the cavities and passageways in the plates 80, 82, I can simultaneously move a plurality of valve balls 126 against the seats 124 and then later, when a flitch is against the cell plate, simultaneously move the plungers 128 to release the valve balls for movement either to their FIG. 4 or their FIG. 6 position, depending upon whether or not their cell areas are completely covered. As discussed in conjunction with FIGS. 8 and 9, I release the positive air pressure through a selectively variable orifice means so that I can control the speed of movement of the plungers 128 in releasing the balls 126 for movement away from the seats 124. By controlling the releasing of the balls 126, I can time the system such that the balls will not quickly jump to close against the seats 116 even if the cell areas are completely covered.

Turning now to FIG. 7, it will be seen that the illustrative valve means 150 includes a valve body 152 similar to valve body 110 and providing a passageway 154 with facing conical seats 156, 158. A ball 160 is disposed between the valve seats in the passageway 154. The ball 160 will seal against either seat to close the passageway, and it will stay between the seats to permit air movement through the passageway. Since the structure of FIG. 7 is ideally suited for a horizontal slicer, a vertically upwardly extending plunger 162 is mounted on a cup 164 which rests on the adjacent deflecting portion of the diaphragm 96. A spring 166 urges the cup 164 and its plunger 162 downwardly. I then provide an inner spring 168 which is coiled about the plunger and which is calibrated such that it supports the ball 160 in its position between the seats 156, 158 when the cell area 76 is completely covered such that a vacuum can form therein. When the cell area is not completely covered, the movement of the air from the cell area through the passageway 154 will move the ball against the urging of the spring 168 downwardly to close against the seat 156. Diagrammatically, I show an air compressor 170 and a conduit 172 connecting the air compressor to an annular passageway 174 which defines also a seat 176 for the diaphragm deflecting portion. When compressed air is injected into the annular passageway 174, the plunger 162 will be moved upwardly to move the ball 160 against the seat 158 for the same reasons discussed in conjunction with FIGS. 4, 5 and 6.

The structure of FIG. 7 can be described in its various conditions of operation. The first condition is when the structure is ready for loading. A vacuum is established in the cavity 178 in communication with or in registry with the valve passageway 154 pulling the ball 160 downwardly on the seat 156. Atmospheric pressure is present in the annular chamber 174 in the base plate. The second condition involves a change in phase because positive air pressure is supplied to the lower chamber moving the plunger 162 upwardly to raise the ball 160 from its lower seat to hold it against the upper seat 158 resealing the system. The third condition then depends upon whether or not the cell area is completely covered. If the cell area is completely covered, when the plunger 162 is released for movement by the spring 166, the ball 160 drops from the upper seat 158 to permit only a slight flow from the covered cell area through the valve passageway insufficient to cause the ball to reseal against the lower seat 156. That situation creates a vacuum or a negative pressure in the cell area space surrounded by the gasket 78 and covered by the flitch. The negative pressure in the cavity 178 will be equal to the negative pressure in the cell area such that the inner spring 168 will merely hold the ball 160 between its two seats 156, 158.

If the cell area is not completely covered by the flitch when the positive air pressure in the annular passageway 174 is released, air flow occurs through the valve passageway sufficient to cause the ball 160 to reseat against the lower seat 156, thereby closing the valve passageway completely and closing the cell area to the vacuum source.

Note that in either third condition, no flow above that necessary to close the valve 150 can exist. The structures for the horizontal and vertical slicers are similar in this respect. For the vertical slicer, the ball 126 merely drops downwardly as shown in FIG. 4 when a vacuum is formed in the associated cell area while the ball 160 for horizontal slicers will merely be supported between the seats by the calibrated spring 168 when a vacuum is formed in the associated cell area.

In FIG. 8, I show the system of FIG. 7 diagrammatically illustrating a vacuum pump 180 and a control valve 182 through which the pump is connected to the passageway 102. I also show a control valve 184 through which the air compressor 170 is connected to the conduit 172 leading to the annular passageway 174. I also show the selectively variable orifice means 186 through which the compressed air in the annular passageway 174 is released, the orifice means being controllable to control the speed with which the plunger 162 is moved to release the ball 160.

Figure 9:
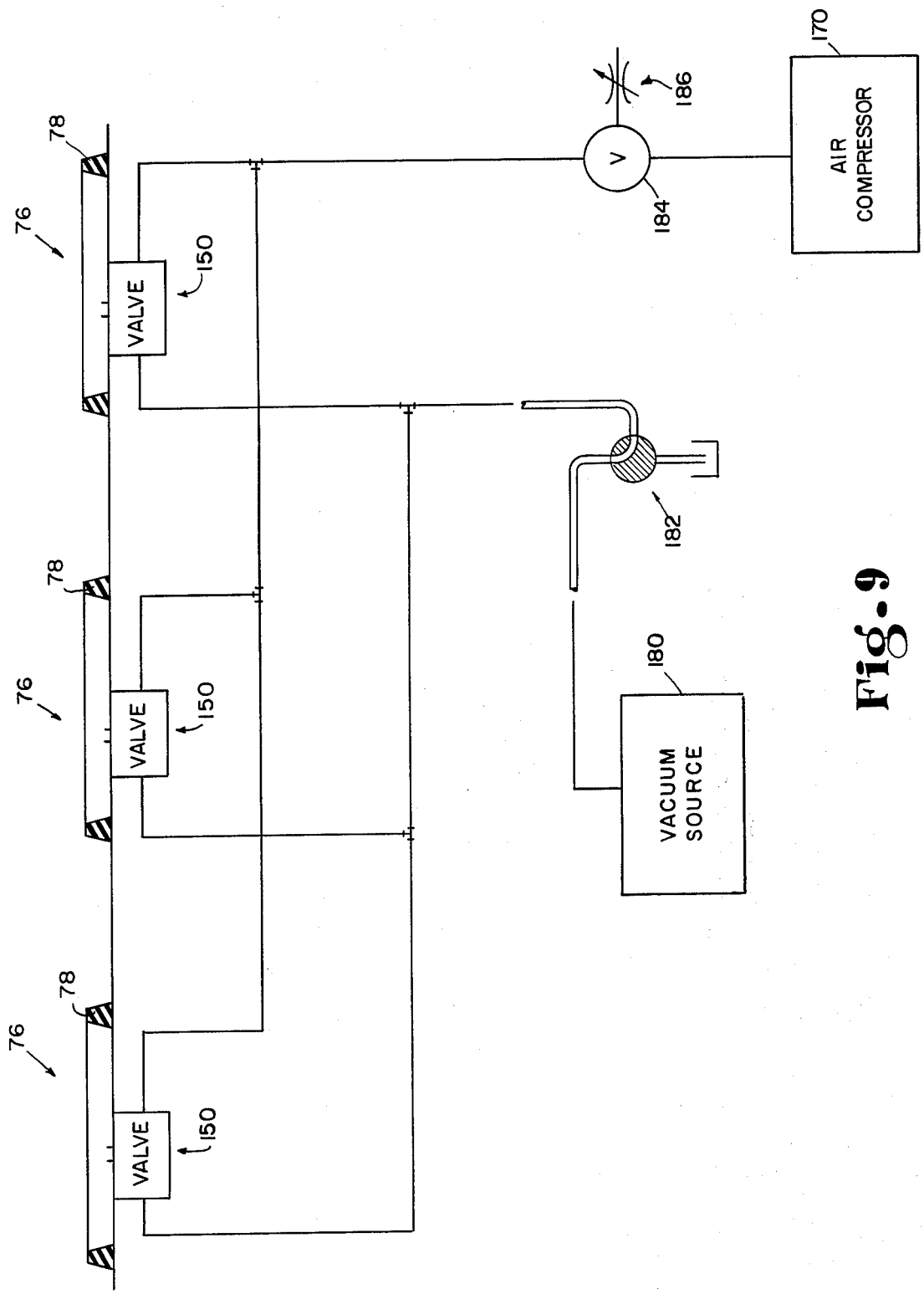
FIG. 9 is a block diagram of the system of the present invention.

FIG. 9 is a very diagrammatical view showing in block form a plurality of cell areas 76, each of which is bounded by sealing means 78 and each of which is equipped with valve means 150. Each valve means 150 includes an actuating means connected to an air compressor 170 through a control valve 184 which leads to a variable orifice means 186. Each valve means is also connected to vacuum source 180 through a control valve 182. The control valve 182 may be released, for instance, to release a flitch from the cell plate. While I show only three cell areas 76, it will be appreciated that my preferred vacuum system may include, for instance, hundreds of such cell areas.

Figure 10:
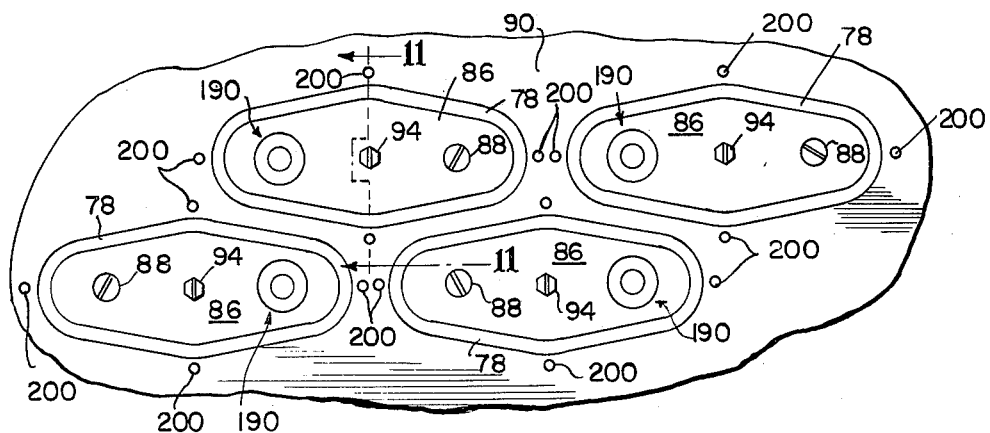
FIG. 10 is a fragmentary view of a different embodiment of the present invention which uses air jets to determine whether each cell area is completely covered.
Figure 11:
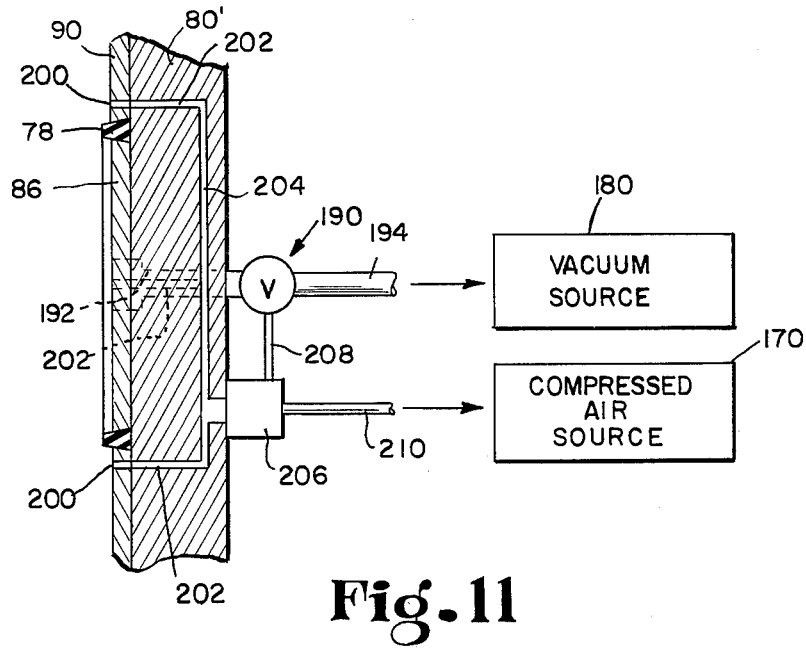
FIG. 11 is a fragmentary sectional view taken along the lines 11—11 of FIG. 10 and diagrammatically showing how the system of FIG. 10 works.

Referring now to FIGS. 10 and 11, another type of valve means and actuating means for determining whether or not a cell area is completely covered will be discussed, the valves or valve means being indicated generally by the reference numeral 190 for each cell area. A valve passageway 192 is formed in some manner in the cell plates leading to the valve 190 and a conduit means 194 connects the valve 190 to the vacuum source. The cell plates are provided with one or more orifices 200 adjacent each cell area. In the illustration, each cell area is provided with four such orifices 200, each orifice 200 being connected by passageways 202, 204 to a pressure-sensitive actuator indicated diagrammatically at 206 which is connected as indicated at 208 to the associated valve 190 and by a conduit means 210 to a compressed air source 170. Of course, the manner in which the passageways 202, 204 are formed need not be discussed in detail herein because the forming of such passageways by drilling and milling is well within the capabilities of machinists. When the air compressor 170 is operated, the output of the air compressor is fed through the means 206 and the passageways 202, 204 to be emitted through each orifice 200. When all four orifices for a cell area are covered by a flitch, the compressed air being supplied through the conduit 210 cannot escape such that pressure will be built up in the means 206. When the pressure in the means 206 exceeds a predetermined level, the valve 190 will be open to open the cell area to the vacuum source. Otherwise, the valve 190 will not be opened. Means 206, for instance, may be a pressure-responsive electrical switch and the valve 190 may be an electrically-operated valve. The means 206 may be, for instance, a spring-loaded plunger which will be moved by the increased pressure to the point that it will trip open the valve 190.

Figure 12:
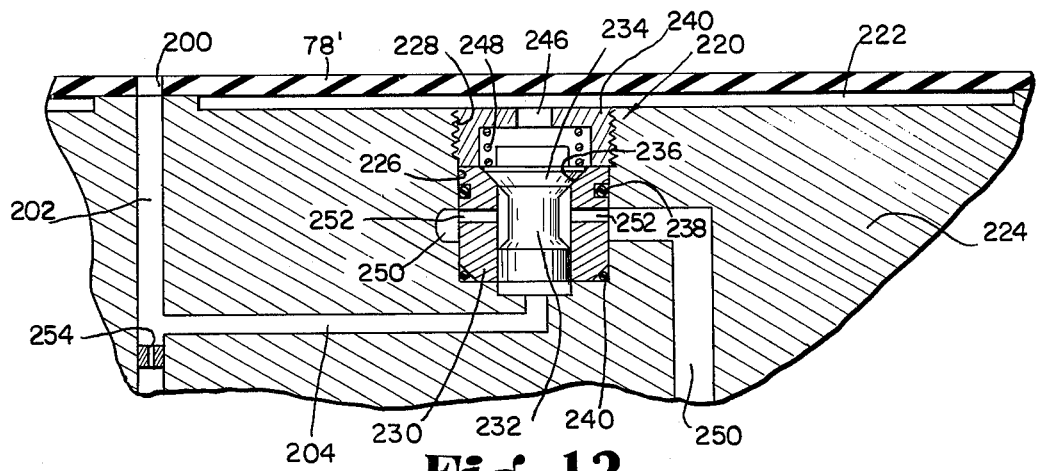
FIG. 12 is a fragmentary sectional view of another embodiment similar to the embodiment of FIGS. 10 and 11.

Referring now to FIG. 12, a more detailed version of the concepts shown in FIGS. 10 and 11 will be discussed.

The structure of FIG. 12 includes a valve 220 for each cell area which, as illustrated, is a shallow cavity 222 bounded by sealing means 78′. The plate 224 in which each cavity 222 is formed is provided with a cylindrical opening or cavity 226, the outer portion of which is threaded as indicated at 228. A cylindrical valve body 230 is placed in the cavity 226, and a spool-type valve member 232 is disposed in the passageway of that valve body. The head 234 of the valve member 232 is conically shaped to seat against a conical seat 236 provided by the valve body 230. An O-ring 238 and a sealing ring 240 seal the valve body 230 to the plate 224. An orifice member 244 is threaded into the outer portion 228 to provide an orifice 246 leading to the valve passageway. A coiled compression spring 248 is disposed between the orifice member 244 and valve member 232 yieldably to urge the valve member to its closing position against the seat 236. The plate 224 provides a passageway 250 which communicates to the interior of the valve passageway through registering openings 252 in the valve body 230.

Compressed air is supplied to the passageway 202 leading to the escape orifice 200. A restriction 254 may be placed in the line as illustrated. When the orifice 200 is closed, the compressed air in the passageway 204 will be sufficient to move the valve member 232 against the urging of the spring 248 to open the valve 220 so that the vacuum can be applied through the valve to the cell area bounded by the sealing means 78′. In other words, the compressed air captured by closing the one or more orifices 200 establishes that the adjacent cell area is completely covered and is sufficient to open the cell area to the vacuum source.

Figure 13:
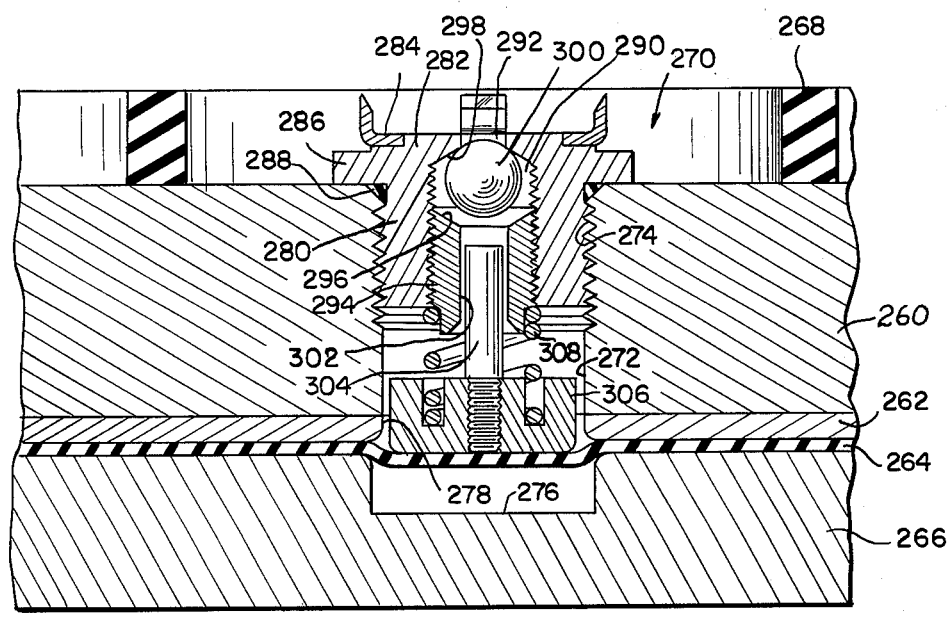
FIG. 13 is a fragmentary sectional view showing my presently preferred type of cell area and valve means.
Figure 14:
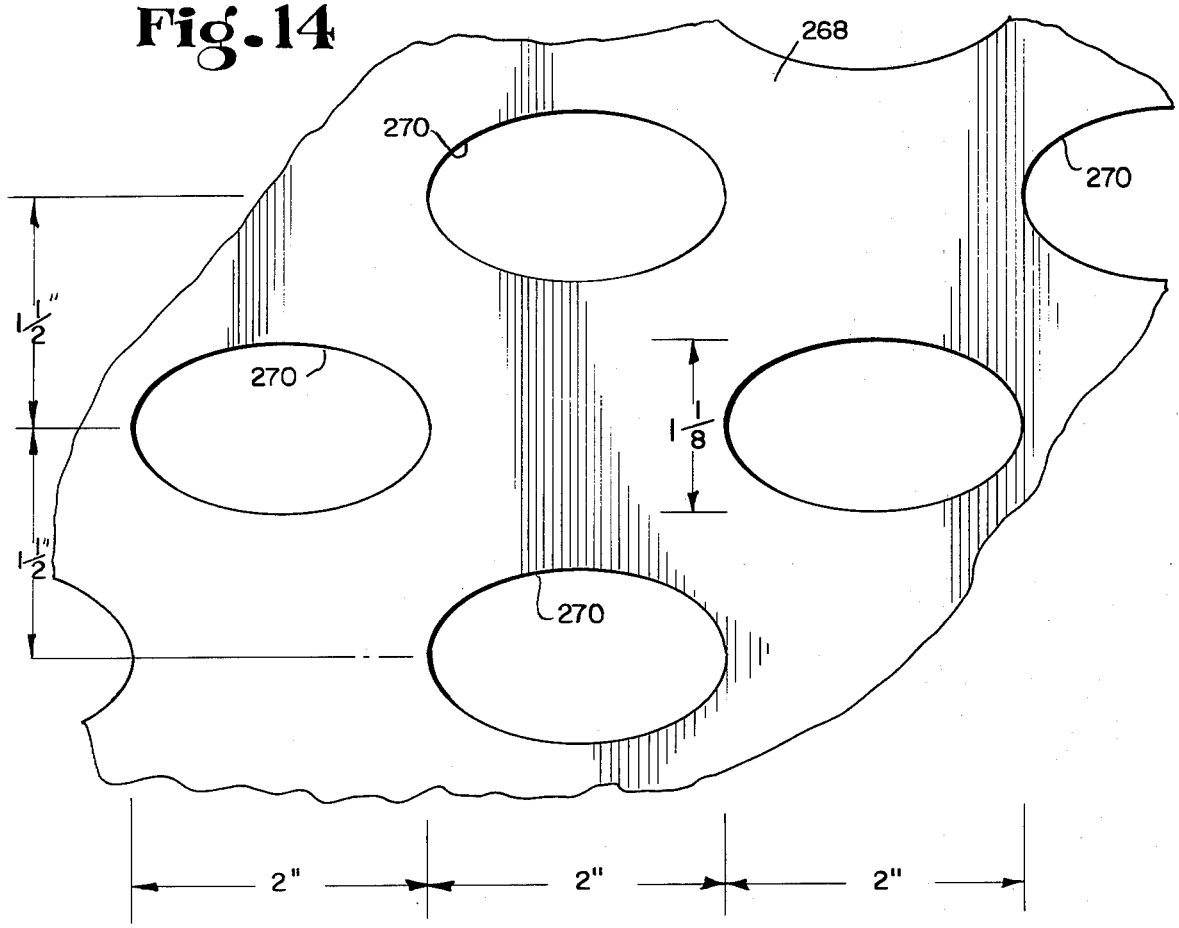
FIG. 14 is a fragmentary view of the rubber mat which covers the cell plate to provide sealing means bounding each cell area.

Referring now to FIGS. 13 and 14, I will describe another of my preferred embodiments of the present invention. The embodiment of FIG. 13 is quite similar to the embodiment of FIGS. 4–6 and the valve means of the embodiment of FIG. 13 functions in the same manner as the valve means of FIGS. 4–6. The system shown in FIG. 13, which is for a vertical slicer, comprises a front plate 260, diaphragm retainer plate 262, rubber or rubber-like diaphragm 264, and base plate 266. A rubber mat 268 having cell areas 270 punched therefrom is adhesively or otherwise secured to the front surface of the plate 260. FIG. 14 shows a portion of such a rubber mat with the arrangement of the cell areas therein, each cell area being an ellipse which has a major diameter of two inches and a minor diameter of 1⅛ inch.

For each cell area 270, a cylindrical opening 272 is formed in the plate 260, the outer portion of which is threaded as indicated at 274. A passageway 276 for compressed air is provided in the base plate 266. The passageway 276 may preferably be a milled slot serving several cell areas. The diaphragm retainer plate 262 is provided with a circular opening 278 in registry with the opening 272 such that only a circular portion of the diaphragm 264 is deflected. A valve body 280 is threaded into the opening 272 as illustrated, the valve body providing a portion 282 projecting outwardly from the front surface of the plate 260. A sharpened dog ring 284 including a plurality of peripherally spaced apart outwardly projecting points is provided for engaging the flitch and holding the flitch against movement in the direction of the front surface of the plate 260. The valve body 280 has a peripherally and radially outwardly extending flange 286 which engages against the front surface of the plate 260 and which compresses a ring seal to seal the valve body to the plate.

The valve body 280 has a coaxial threaded bore 290 and an opening 292 providing communication between the cell area 270 and the threaded bore 290. An orifice member 294 is threadedly engaged into the bore 290 as illustrated, and it provides a first conical valve seat 296. The second conical valve seat 298 is provided by the valve body 280. A valve ball 300 is engageable with each seat 296, 298 as discussed previously. The ball may also fall down between the two seats to open the valve passageway. The orifice member 294 is provided with a coaxial bore 302 through which a plunger 304 moves. The plunger is part of the actuating means which moves the ball 300 away from the valve seat 296 during the flitch mounting process. The plunger 304 is carried by a cup 306, and a coiled compression spring 308 is used to urge the cup and the plunger to the ball releasing position.

I claim:

1. A veneer slicer comprising a reciprocable flitch table, a knife and pressure bar assembly movable toward and away from the path of reciprocation of said flitch table, and means for reciprocating said flitch table, in which the improvement comprises vacuum means for holding flitches to said table, said vacuum means including a vacuum source, at least one vacuum cell plate mounted on said flitch table for movement therewith, said cell plate providing a front surface facing said knife and pressure bar assembly and against which a flitch is held, said cell plate providing a plurality of cell areas in said front surface, sealing means extending about each cell area, conduit means for connecting said cell areas to said vacuum source, said conduit means including, for each cell area, valve means, each said valve means including means for determining when its associated cell area is completely covered by a flitch and opening said cell area to said vacuum source only when it is completely covered by a flitch, said determining means including actuating means for opening said valve means to air flow from said cell area to said vacuum source, the air flow from said cell area being sufficient to close said valve means when said cell area is not completely covered and insufficient to close said valve means when said cell area is completely covered.

2. The improvement of claim 1 in which each valve means includes means providing a valve passageway having a first valve seat therein, and a valve member movable against said first valve seat to close said passageway, thereby closing its associated cell area to said vacuum source, said actuating means including means for holding said valve member away from said first valve seat and releasing said valve member for movement against said first valve seat by the air flow from said cell area when said cell area is not completely covered such that a vacuum can form therein.

3. The improvement of claim 2 in which said passageway provides a second valve seat spaced apart from said first valve seat, said valve member being movable between said seats and movable against said second seat to close said passageway, said actuating means being effective to move said valve member against said second seat and hold it there while a flitch is being placed against said front surface and to release said valve member for movement toward said first valve seat when the flitch is against said front surface.

4. The improvement of claim 3 in which said valve member is a spherical ball having a first diameter, said passageway being cylindrical and having a second and greater diameter, said valve seats being conical and facing each other, whereby, when the associated cell area is completely covered such that a vacuum is formed therein, said ball stays out of engagement with said seats to open said cell area to said vacuum source.

5. The improvement of claim 2 in which each actuating means includes an air actuated plunger for moving said valve member, a source of compressed air, and conduit means connecting said plungers to said source of compressed air.

6. The improvement of claim 5 in which said conduit means includes valve means for simultaneously supplying air under pressure to said plungers and simultaneously exhausting the air from said plungers, said conduit means including selectively variable orifice means through which the air under pressure is exhausted, whereby the speed of movement of said plungers in releasing said valve members is controlled.

7. The improvement of claim 4 in which each actuating means includes an air actuated plunger for moving its associated ball against said second valve seat, holding it there, and releasing it for movement toward said first valve seat, a source of compressed air, and condiut means connecting said plungers to said source of compressed air.

8. The improvement of claim 7 in which each actuating means includes spring means for yieldably urging its associated plunger to its retracted, ball releasing position, the compressed air conduit means including valve means for simultaneously supplying air under pressure to said plungers and simultaneously exhausting the air from said plungers, and selectively variable orifice means through which the air under pressure is controlled and by which the speed of movement of the plungers in releasing the balls is controlled.

9. The improvement of claim 5 in which said cell plate provides a back surface having a plurality of cavities therein in registry respectively with said cell areas, a rubber diaphragm covering said back surface and said cavities, said conduit means for the compressed air including a base plate having air passageways formed therein, portions of which overlie said cavities, whereby positive air pressure in said passageways deflects the portions of said diaphragm overlying said cavities, said plungers being movable by said deflecting diaphragm portions, and spring menas for yieldably resisting movement of said plungers by said diaphragm portions.

10. In a veneer slicer comprising a knife assembly, and a reciprocable flitch table on which flitches are mounted for reciprocation relative to said knife assembly, the improvement comprising a vacuum system for holding flitches to said flitch table, said system comprising a vacuum pump, means providing a plurality of cell areas opening toward said knife assembly and against which flitches are held, sealing means bounding each cell area sealably to engage the flitches, valve means for connecting each cell area to said vacuum pump, each valve means including means providing a valve passageway communicating between its associated cell area and said vacuum pump, a valve member for closing said passageway, and plunger means for shifting said valve member away from its position closing said passageway and releasing said valve member for movement controlled by the air flow from the cell area through said passageway, the air flow being insufficient to move the valve member to its closing position when the cell area is completely covered.

11. The improvement of claim 10 in which each said plunger means includes an air actuated plunger for moving said valve member, a source of compressed air, and conduit means connecting said plungers to said source of compressed air.

12. The improvement of claim 11 in which each said plunger is effective to move the associated valve member away from its closing position, to hold it away from its closing position while a flitch is being placed against the associated cell area, and to release said valve member for movement toward its closing position when the flitch is against the cell area.

13. The improvement of claim 12 in which said valve member and said passageway are proportioned and designed such that, when the cell area is completely covered and evacuated, the pressure on opposite sides of said valve member is equalized such that said valve member, when released, will not move to its closing position.

14. The invention of claim 10 in which said means providing a plurality of cell areas includes at least one cell plate providing a front surface including said cell areas and a back surface, said back surface having a plurality of cavities therein in registry, respectively, with said cell areas, said valve passageways communicating respectively between said cell areas and said cavities, said plunger means including a diaphragm covering said back surface and said cavities, a base plate covering said diaphragm, said base plate having air passageways therein, portions of which overlie said cavities, a source of compressed air and means for connecting said source of compressed air to the passageways in said base plate, whereby compressed air in said passageways will deflect the portions of said diaphragm overlying said cavities, and plungers in said cavities movable by said deflecting diaphragm portions to move said valve members.

15. The improvement of claim 14 in which each valve passageway has a first conical valve seat facing the associated cell area and an axially spaced apart second conical valve seat facing said first valve seat, said valve member being a spherical ball movable between and engageable with said seats, said passageway having a diameter greater than said ball such that said passageway is closed by said ball only when said ball is engaging one of said seats, the plunger associated with said valve passageway being effective to move said ball against said second seat and to hold it there when a flitch is being placed against said associated cell area and then to release said ball for movement toward said first seat, said ball and valve passageway being proportioned and designed such that, if said cell area is not completely recovered, the movement of air from said cell area through said valve passageway will move said ball into sealing engagement with said first seat and, if cell area is completely covered such that a vacuum is formed therein, said ball will stay between said seats to keep said cell area open to said vacuum pump.

16. The improvement of claim 15 including selectively variable orifice means for exhausting the compressed air from said passageways in said base plate to control the speed of movement of the plungers in releasing said balls for movement toward said first valve seats.

17. The improvement of claim 12 including selectively variable orifice means for exhausting the compressed air from said conduit means to control the speed of movement of said plungers in releasing said valve members for movement toward their closing positions.

18. The improvement of claim 16 including spring means yieldably resisting the movement of said plungers by said diaphragm.

19. The improvement of claim 12 including spring means for yieldably urging each plunger toward its releasing position.

20. In a veneer slicer comprising a flitch table providing a mounting surface, a plurality of dogs for gripping a flitch at a first distance from said mounting surface and holding the flitch securely against a central portion of the mounting surface, a plurality of extension dog assemblies mounted on said flitch table to grip a flitch at a second and greater distance from the mounting surface, each extension dog assembly including opposing jaws positioned to engage generally opposite portions of a flitch, means for guiding said jaws for movement toward said central portion to their gripping positions and away from said central portion to their releasing positions, and power means for moving said opposing jaws between their respective gripping and releasing positions, means for reciprocating said flitch table in the plane of said mounting surface, and a knife assembly movable along a path toward and away from said mounting surface, the improvement comprising vacuum means for holding flitches to said table, said vacuum means including a vacuum source, at least one vacuum cell plate mounted on said flitch table for movement therewith, said cell plate being secured to said flitch table mounting surface by the gripping action of said first mentioned dogs, said cell plate being disposed between a pair of said extension dog assemblies such that the jaws of said assemblies can engage a flitch and hold it against said cell plate, said cell plate providing a front surface facing said knife assembly and against which the flitch is held, said cell plate providing a plurality of cell areas in said front surface, conduit means for connecting said cell areas to said vacuum source, said conduit means including, for each cell area, valve means effective to open said cell area to said vacuum source only when said cell area is completely covered by a flitch, each valve means including means providing a valve passageway from said cell area to said vacuum source, a valve member having a position closing said passageway, and actuating means for moving said valve member away from said closing position and releasing said valve member for movement controlled by the air flow from said cell area to said vacuum source, the amount of air flow being sufficient to move said valve member to said closing position when the cell area is not completely covered such that a vacuum can form therein.

21. The improvement of claim 20 in which said valve passageway provides a first valve seat therein facing the said cell area, said valve member being movable against said first seat to close said valve passageway, thereby closing the associated cell area to said vacuum source, and said actuating means being effective to move said valve member away from said first seat toward said cell area, hold it away from said first seat while a flitch is being placed against said front surface, and then release it for movement toward said first seat when a flitch is against said front surface, said valve member and said passageway being proportioned and designed such that, if said cell area is not completely covered, the movement of air from said cell area through said passageway will move said valve member into sealing engagement with said first seat and, if said cell area is completely covered such that a vacuum is formed therein, said valve member will not move against said first seat.

22. The improvement of claim 21 in which said passageway provides a second valve seat spaced apart from and facing said first valve seat, said member being movable between and sealably engageable with both of said valve seats, said actuating means being effective to move said valve against said second seat and hold it there while a flitch is being placed against said front surface and to release said valve member for movement toward said first valve seat when the flitch is against said front surface.

23. The improvement of claim 22 in which each actuating means includes an air actuated plunger for moving said valve member, a source of compressed air, and conduit means connecting said plungers to said source of compressed air.

24. The improvement of claim 23 in which said conduit means includes valve means for simultaneously supplying air under pressure to said plungers and simultaneously exhausting the air from said plungers, said conduit means including selectively variable orifice means through which the air under pressure is exhausted, whereby the speed of movement of said plungers in releasing said valve members is controlled.

25. The improvement of claim 23 in which said cell plate provides a back surface having a plurality of cavities therein in registry respectively with said cell areas, a rubber diaphragm covering said back surface and said cavities, said conduit means for the compressed air including a base plate having air passageways formed therein, portions of which overlie said cavities, whereby positive air pressure in said passageways deflects the portions of said diaphragm overlying said cavities, said plungers being movable by said reflecting diaphragm portions, and spring means for yieldably resisting movement of said plungers by said diaphragm portions.

26. The improvement of said claim 22 in which said means providing a valve passageway includes a cylindrical cell body threadedly engaged into said cell plate, said cell body having a coaxial threaded cylindrical bore therein providing said second valve seat, an orifice member threadedly engaging said bore and providing said first valve seat, said seats being frusto-conically shaped, said valve member being a ball, the diameter of which is less than the diameter of said bore.

27. The improvement of claim 26 in which each said cell body extends axially outwardly from said front surface, and a sharpened dogging device mounted on each cell body to engage the flitch held thereagainst.

28. The improvement of claim 26 in which each actuating means includes an air actuated plunger for moving said ball, a source of compressed air, and couduit means for connecting said plunger to said source of compressed air, said plunger extending through said orifice member to engage said ball.

29. The improvement of claim 28 in which said conduit means includes valve means for simultaneously supplying air under pressure to said plungers and simultaneously exhausting the air from said plungers, said conduit means including selectively variable orifice means through which the air under pressure is exhausted, whereby the speed of movement of said plungers in releasing said valve members is controlled.

30. The improvement of claim 27 in which said cell plate includes a rubber-like mat forming said front surface, said mat having openings therein defining said cell areas.

* * * * *

UNITED STATES PATENT OFFICE
CERTIFICATE OF CORRECTION

Patent No. 3,905,408　　　　　　　　Dated September 16, 1975

Inventor(s) Thomas F. Hale

It is certified that error appears in the above-identified patent and that said Letters Patent are hereby corrected as shown below:

Column 8, line 13, change "96 is" to --96 in--.

Column 10, line 23, before "vacuum" insert --a--.

Column 13, line 26 (claim 7), change "condiut" to --conduit--.

Column 13, line 49 (claim 9), change "menas" to --means--.

Colunn 13, line 62 (claim 10), after "each" insert --said--.

Column 14, line 58 (claim 15), change "recovered" to --covered--.

Column 14, line 60 (claim 15), after "if" insert --said--.

Column 16, line 17 (claim 22), after "valve" insert --member--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*